(12) United States Patent
Engelen et al.

(10) Patent No.: US 11,137,528 B2
(45) Date of Patent: Oct. 5, 2021

(54) SYSTEM FOR OPTICAL IMAGING COMPRISING MATCHED SPECTRAL FILTERS

(71) Applicant: Lumileds LLC, San Jose, CA (US)

(72) Inventors: Rob Engelen, Eindhoven (NL); Varun Dev Kakkar, Eindhoven (NL)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/697,728

(22) Filed: Nov. 27, 2019

(65) Prior Publication Data

US 2020/0174169 A1 Jun. 4, 2020

(30) Foreign Application Priority Data

Nov. 29, 2018 (EP) .................................... 18209167

(51) Int. Cl.
| | | |
|---|---|---|
| *G06K 9/20* | (2006.01) | |
| *G02B 5/28* | (2006.01) | |
| *G01J 1/04* | (2006.01) | |
| *G01J 1/08* | (2006.01) | |
| *G01J 1/42* | (2006.01) | |
| *H04N 5/235* | (2006.01) | |

(Continued)

(52) U.S. Cl.
CPC .............. *G02B 5/28* (2013.01); *G01J 1/0437* (2013.01); *G01J 1/08* (2013.01); *G01J 1/42* (2013.01); *H04N 5/2254* (2013.01); *H04N 5/2354* (2013.01); *G06K 9/00221* (2013.01); *G06K 9/2036* (2013.01)

(58) Field of Classification Search
CPC . G01J 1/0437; G01J 1/42; G02B 5/28; G06K 9/2018; G06K 9/2036; G06K 9/209; H04N 5/2254; H04N 5/2354

USPC ....................................... 250/226, 216, 208.1
See application file for complete search history.

(56) References Cited

U.S. PATENT DOCUMENTS

| 7,218,650 | B2 | 5/2007 | McDonald | |
|---|---|---|---|---|
| 9,568,362 | B2 * | 2/2017 | Ockenfuss | ........... A61B 5/0071 |
| 2010/0039508 | A1 | 2/2010 | Li | |

(Continued)

FOREIGN PATENT DOCUMENTS

WO 2018/154342 8/2018

OTHER PUBLICATIONS

"European Application Serial No. 18209167.8, Communication pursuant to Article 90(3) and Rule 60 EPC dated Jan. 18, 2019", 1 pg.

(Continued)

*Primary Examiner* — Que Tan Le
(74) *Attorney, Agent, or Firm* — Schwegman Lundberg & Woessner, P.A.

(57) ABSTRACT

Systems, methods and devices are for optical imaging are described. A system includes a light source and a light detection unit. The light source includes a light-emitting device and a first spectral filter opposite the light emitting device. The first spectral filter includes at least one dielectric filter and has a first angular dependence of a transmission passband. The light source further includes at least one reflector adjacent side surfaces of the light emitting device. The light detection unit includes an optical sensor and a second spectral filter opposite the optical sensor. The second spatial filter has a second angular dependence of a transmission passband that is matched to the first angular dependence.

20 Claims, 4 Drawing Sheets

(51) Int. Cl.
   *H04N 5/225*      (2006.01)
   *G06K 9/00*       (2006.01)

(56) References Cited

U.S. PATENT DOCUMENTS

2014/0211071 A1   7/2014   Pawlik et al.
2016/0086018 A1   3/2016   Lemoff
2017/0161578 A1   6/2017   Ivanisov et al.
2017/0269279 A1   9/2017   Wyatt

OTHER PUBLICATIONS

"European Application Serial No. 18209167.8, Extended European Search Report dated May 24, 2019", 7 pgs.
"International Application Serial No. PCT/EP2019/081492, International Search Report dated Feb. 19, 2020", 4 pgs.
"International Application Serial No. PCT/EP2019/081492, Written Opinion dated Feb. 19, 2020", 9 pgs.

* cited by examiner

SYSTEM FOR OPTICAL IMAGING COMPRISING MATCHED SPECTRAL FILTERS

FIELD OF INVENTION

The present disclosure relates to systems for optical imaging, in particular in the area of optical authentication, biometry, and machine vision.

BACKGROUND

Optical imaging may be used for authentication and machine vision purposes, for instance in automated inspection. In this context, optical imaging may benefit from a well-controlled and defined illumination of the object under investigation. Therefore, typically a dedicated light source is used to illuminate the object. However, the influence of ambient light may be problematic in optical imaging, as ambient light introduces illumination from an undefined and highly varying source. Automated processing of images may therefore be hindered by the influence of ambient light.

As an option, ambient light image subtraction may be performed during image processing. The problem of the influence of ambient light may also be partially overcome by an optical detection unit and a dedicated light source with properties corresponding to each other, e.g. an IR camera in combination with an IR light source.

Spectral filters may be used to match the wavelengths emitted by the light source to the wavelengths detected by the detection unit to suppress the contribution of ambient light. To this end, spectral filters are typically used for the optical detection unit, for instance in a camera system. The spectral filter has transmission properties, i.e. a transmission passband in a wavelength range, which is adapted to the wavelength range of the light emitted by the light source.

However, in particular for spectral filters relying on interference effects such as dielectric spectral filters, the transmission passband and therefore the wavelengths that may pass the filter depend on the incidence angle of the light on the spectral filter. That is, typically the transmission passband shifts towards smaller wavelengths when the incidence angle becomes larger. The shift of the transmission passband is in particular problematic when the passband is narrower than the spectrum of the dedicated light source. However, a narrow passband is desirable to suppress the contribution of the ambient light in image detection.

SUMMARY

It is an object of the present invention to provide a system for optical imaging comprising a light source and a light detection unit, wherein the light emitted by the light source may be detected in an efficient manner while improving the suppression of ambient light. The invention further relates to a use of a lighting device and a method for producing a lighting device based on the aforementioned object.

According to a first aspect of the present invention, a system for optical imaging is provided, the system comprising: a light source; a light detection unit; a first spectral filter of the light source, wherein the first spectral filter has a first angular dependence of a transmission passband; and a second spectral filter of the light detection unit, wherein the second spectral filter has a second angular dependence of a transmission passband; wherein the first angular dependence and the second angular dependence are matched to each other.

According to a second aspect of the present invention, a use of a lighting device for optical imaging is provided, the lighting device having a light source and a first spectral filter, wherein the first spectral filter has a first angular dependence of a transmission passband; wherein the lighting device is used to provide illumination for a light detection unit having a second spectral filter, wherein the second spectral filter has a second angular dependence of a transmission passband; and wherein the first angular dependence and the second angular dependence are matched to each other.

According to a third aspect of the present invention, a method for producing a lighting device for optical imaging is provided, the method comprising: providing a light source; providing a first spectral filter, wherein the first spectral filter has a first angular dependence of a transmission passband; matching the first angular dependence to a second angular dependence of a second spectral filter for a light detection unit, the second spectral filter having the second angular dependence of a transmission passband; and combining the light source and the first spectral filter in a lighting device.

Exemplary embodiments of the first, second and third aspect of the invention may have one or more of the properties described below.

The light source is configured to illuminate an object under investigation. The light source emits in particular a spectrum within a range of wavelengths that corresponds to the first spectral filter and/or second filter, for example in that the light source has at least one intensity maximum in the transmission passband of the filter(s) at least under one incidence angle. The light source may in particular emit light in the (near) infrared range, visible range, and/or the ultraviolet range.

The light detection unit may comprise one or more optical sensors that are capable to determine the intensity of incident light, in particular in the (near) infrared range, visible range, and/or the ultraviolet range. In particular, the light detection unit is configured to obtain a spatial and/or angular resolution of light reflected from an object under instigation, which object of instigation is illuminated by the light source. To determine an intensity of incident light, the light detection unit may comprise at least one semiconductor element, e.g. at least one diode, CCD element, and/or CMOS element. The light detection unit may comprise optical elements such as diffractive or refractive elements, e.g. lenses and/or reflecting surfaces.

The first spectral filter of the light source is provided, which is arranged to filter the light emitted by the light source towards an object under investigation. Similarly, the second spectral filter of the light detection unit is arranged to filter the light directed towards the light detection unit, e.g. when reflected from the object under instigation, before the light is detected in the light detection unit. The first and second spectral filters are passband filters and are configured to supress the transmission of light with wavelengths outside at least one corresponding transmission passband, while the light with wavelengths inside the corresponding transmission passband is mostly or completely transmitted. For instance, the transmission passband(s) of the spectral filter(s) may be represented by a wavelength range in which the spectral filter has a transmissivity of at least 50%, in particular at least 80%, while the transmissivity of the remaining wavelength ranges is lower than these values, and in particular lower than 10% or 5%. The transmission passband(s) may be characterized by an average transmissivity ($T_{avg}$), centre wavelength (CWL), guaranteed minimum bandwidth (GMBW), and/or full width half maximum (FWHM). The transmissivity outside the transmission passband(s) may be characterized by an optical density (OD).

The first spectral filter has a first angular dependence of the transmission passband. That is, the transmission properties change with the incidence angle on the first filter. Light emitted by the light source towards different directions therefore may have different spectral characteristics (i.e. a different intensity distribution in dependence of wavelength) after passing the first spectral filter.

Similarly, the second spectral filter of the light detection unit has a second angular dependence of a transmission passband. That is, the transmission properties change with the incidence angle on the second filter and light directed towards the light detection unit may be filtered with different spectral characteristics by means of the second filter depending on the incidence angle.

For example, the first spectral filter and/or second spectral filter may have a substantially flat or planar shape, wherein the transmission passband changes with the incidence angle that may be defined as the angle of the light hitting the respective filter relative to a normal direction of said flat shape. For instance, at least one of the spectral transmissive properties, e.g. CWL (Center Wave Length), FWHM (Full Width at Half Maximum), $T_{avg}$ (Transmission average), and OD may shift or vary depending on the incidence angle on the first spectral filter and/or second spectral filter.

With the present invention, it has been found that the first angular dependence and second angular dependence may be used to improve the efficiency of the detection, while suppressing the contribution of ambient light, while optimizing the amount of light emitted by the light source in the detection by the light detection unit. The first angular dependence and the second angular dependence are matched to each other. For instance, the light source and the light detection unit, together with the first spectral filter and the second spectral filter may be arranged such that an object under instigation may be brought into a position wherein light emitted by the light source is detected by the light detection unit after reflection by the object. The relative arrangement may be configured such that the light emitted at a certain angle (with a transmission passband according to the incidence angle at the first spectral filter and therefore a specific wavelength range passing the first spectral filter) and reflected by the object impinges at an incidence angle at the second spectral filter such that the transmission passband of the second spectral filter is matched to the specific wavelength range passing the first spectral filter. For instance, at least one of CWL, FWHM may be substantially identical for the first spectral filter and the second spectral filter in respect to this combination of incidence angles. Hence, contrary to a strategy of choosing filter types that show a small angular dependence of the transmission passbands, the angular dependence of the transmission passbands in the first and second spectral filters may be used in an advantageous manner, increasing the intensity of light detected by the light detection unit while improving the contrast between the (dedicated) light source and the ambient light. Further, filter types that show a small angular dependence of the transmission passbands may be cost-intensive to produce, as such filter typically comprise a large number of layers. With the present invention, filter types that are more cost-effective to produce and that in particular comprise only few layers may be utilized.

To optimize the suppression of the ambient light, in particular the first spectral filter and/or second spectral filter may have a narrow transmission passband. In particular, the transmission passband may be narrow in comparison to the wavelength range emitted by the light source. In some embodiments, the FWHM of the transmission passband of the first spectral filter and/or second spectral filter may be smaller or equal than 50 nm, in particular smaller or equal than 40 nm or 20 nm. For narrow transmission passbands, matching the first angular dependence and the second angular dependence to each other results in a significant improvement of detected intensity, as the shift of the transmission passband(s) due to the variation in incidence angle may be larger than the width of the transmission passband(s).

In an exemplary embodiment of the invention, the first spectral filter and the second spectral filter have a substantially identical transmission passband. That is, the CWL, FWHM, $T_{avg}$, and OD may be substantially identical for at least one combination of incidence angles. In particular, the first angular dependence and the second angular dependence are substantially identical. For instance, the CWL, and/or FWHM of the first spectral filter and the second spectral filter may be substantially identical under an identical incidence angle. For example, a similar filter type is used with similar optical elements. In case an interference filter is used, the layered structure of the filter may for example be similar and may comprise similar (e.g. substantially identical or identical) materials and/or layer thicknesses.

In an exemplary embodiment of the invention, the light source and the light detection unit are arranged adjacent to each other. With the light source and detection unit being arranged adjacent to each other, when an object is positioned in front of the light detection unit, the emission angle of the light source (and in particular the incidence angle on the first spectral filter) and the incidence angle on the light detection unit (and in particular the incidence angle on the second spectral filter) can be matched in a particular simple manner, such that for instance a first spectral filter and a second spectral filter with a substantially identical transmission passband may be used. Further, arranging the light source and the light detection unit adjacent to each other may result in a small form factor that is beneficial for incorporating the system into electronic devices such as mobile devices.

As already mentioned above, in particular a first and/or second spectral filter based on an interference filter may be used. In an exemplary embodiment of the invention the first spectral filter and/or the second spectral filter comprises at least one dielectric filter. Dielectric filters typically show a high suppression of light outside the transmission passband(s) and may be configured for a variety of different light sources. Further, dielectric filter may show a distinct angular dependence of the passband(s) and are therefore particularly useful for the matching of the first angular dependence and the second angular dependence.

In another exemplary embodiment of the invention, the first spectral filter and/or the second spectral filter comprises at least one photonic crystal, at least one diffractive optical element, at least one metasurface filter, at least one plasmonic filter, and/or at least one nano-resonator filter. The corresponding filter types may also show a distinct angular dependence of the passband(s), such that the intensities of the detected light and the suppression of ambient light may be optimized when using these filter types for the first spectral filter and/or the second spectral filter.

The first spectral filter and/or second spectral filter may have a single transmission passband, e.g. the filter may have only a single (continuous) wavelength range wherein a substantial transmission of light is allowed. However, the present invention is not restricted to filter types for the first and second spectral filter having only a single passband. In another exemplary embodiment of the invention, the first spectral filter and/or the second spectral filter has a dual transmission passband. Hence, the intensity of the light emitted and detected in by the system may be improved. In case of a dual transmission passband, the first and second angular dependences of one of the two transmission passbands may be matched. Further, both passbands of the dual transmission passband may also be matched in their angular dependencies. For example, a spectral filter that passes wavelengths in the visible light range and wavelengths in the NIR range may be used. In particular, the passband in the visible range is a wide passband and the passband in the NIR range is a narrow passband. The passbands may also have different angular dependences. For instance, the passband in the visible range may have a smaller angular shift than the passband in the NIR range. A smaller angular shift in the visible range may be advantageous to obtain color consistency in the light detection unit, e.g. in a color camera such as an RGB sensor. In particular, the NIR passband of a dual passband spectral filter may be (more) sensitive to the incidence angle than a single NIR passband spectral filter. In other embodiments, first and/or second spectral filters with multiple passbands and more than two passbands may be used, i.e. three transmission passbands or more.

In an exemplary embodiment of the present invention, the light source comprises at least one light-emitting diode (LED). LEDs may comprise at least one semiconductor element such as a p-n-junction, a diode, and/or a transistor. For instance, the LEDs may be provided in form of separate or combined LED dies and/or LED packages, wherein particular at least one LED may be arranged on a substrate. An LED package may for instance comprise a wavelength conversion element (e.g. based on phosphor) and/or may comprise at least one optical element such as a diffusing layer, a diffractive element (e.g. a lens) and/or a reflective element (e.g. reflecting elements such as a reflecting cup). The light source and in particular the LED may be configured to emit light in a wavelength range of 400 nm to 1100 nm, in particular 800 nm to 1000 nm.

In an exemplary embodiment of the present invention, the light source and in particular the LED is partially encased by a package comprising reflective elements. By surrounding at least part of the light source with a reflective package, firstly, the amount of light directed towards the first spectral filter may be enhanced.

Secondly, in particular when using a first spectral filter based on a dielectric filter, light not passing the first spectral filter may be reflected by the first spectral filter and may then again be reflected within the package. When the reflective elements reflect the light back towards the first spectral filter with a different incidence angle, the light may have multiple opportunities to pass the first spectral filter. Hence, the overall intensity of light passing the first spectral filter is improved.

Thirdly, the reflective elements in the package may be used to shape the beam of light, e.g. by means of elements such as a reflector cup. The reflective elements may have a high specular and/or diffuse reflectance. The reflective elements may have a shape that is adapted to the geometry of the spatial distribution of light emission of the light source, e.g. the at least one LED, such that the amount of light redirected towards the first spectral filter is further optimized. The package may be configured as a "white" package, wherein the white package for instance comprises "white" walls encapsulating the light source with highly reflective material, such as polymer materials like silicone. Reflective particles such as $TiO_x$ particles may be embedded in the polymer material. The white package may comprise side walls for at least one LED and in particular comprise a substrate or lead frame for at least one LED coated with a reflective material.

The package may in particular further comprise the first spectral filter. For instance, the reflective elements such as reflective side walls may be configured as support for the first spectral filter. In an embodiment, the reflective elements may surround the light source forming an opening, wherein the first spectral filter covers the opening. Hence, light is essentially reflected within the package until the light impinges on the first spectral filter with an incidence angle that allows the light to be transmitted, wherein the wavelength of the light lies within the transmission passband at that particular incidence angle.

In another exemplary embodiment of the present invention, an electronic device is provided, the electronic device comprising the system for optical imaging according to the first aspect of the invention. The electronic device may be configured for optical authentication and biometry, for instance for an authentication based on iris and/or face recognition. The electronic device may for instance be configured as a computer, a thin client and/or a portable computer (mobile device), such as a laptop computer, a tablet computer, a wearable, a personal digital assistant or a smartphone. The electronic device comprising the system may also be configured for machine vision. In particular, the optical imaging may be used in automated inspection. The electronic device may be configured to perform the optical authentication and/or machine vision as a standalone system or in conjunction with other devices. For example, the electronic device may be configured to connect to a network to perform optical authentication and/or machine vision together with other devices connected to the network.

The method according to the third aspect comprises providing a light source; providing a first spectral filter, wherein the first spectral filter has a first angular dependence of a transmission passband on an incidence angle; and combining the light source and the first spectral filter in a lighting device.

The first angular dependence is matched to a second angular dependence of a second spectral filter. For instance, the second spectral filter may have known characteristics and the first spectral filter is chosen accordingly, in particular wherein the first spectral filter is chosen to have a substantially identical transmission passband to a second spectral filter. Further, the first angular dependence may be chosen such that is substantially identical to a second angular dependence of a second spectral filter. Hence, the lighting device produced by the method according to the third aspect may be particularly suitable for combination with a light detection unit with a second spectral filter having the second angular dependence of a transmission passband on an incidence angle. As described above, the lighting device may be used for optimization of the intensity of light detected by the light detection unit while effectively suppressing the contribution of ambient light.

In another exemplary embodiment according to the invention, the light source is partially encased by a package comprising reflective elements, wherein the reflective package in particular further comprises the first spectral filter. The intensity of light transmitted through the first spectral filter may therefore be enhanced, as light may reflected at the first spectral filter may be reflected in the package and subsequently pass the first spectral filter.

In another exemplary embodiment according to the invention, the method according to the third aspect may further comprise: combining the lighting device with a light detection unit and the second spectral filter for the light detection unit. Hence, a system according to the first aspect may be produced by the method according to the invention.

The features and example embodiments of the invention described above may equally pertain to the different aspects according to the present invention. In particular, with the disclosure of features relating to the system according to first aspect also corresponding features relating to the use according to the second aspect and to the and the method for production according to the third aspect are disclosed.

It is to be understood that the presentation of embodiments of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE DRAWING(S)

Examples of the invention will now be described in detail with reference to the accompanying drawing, in which.

DETAILED DESCRIPTION OF THE PREFERRED EMBODIMENT(S)

Figure 1A:
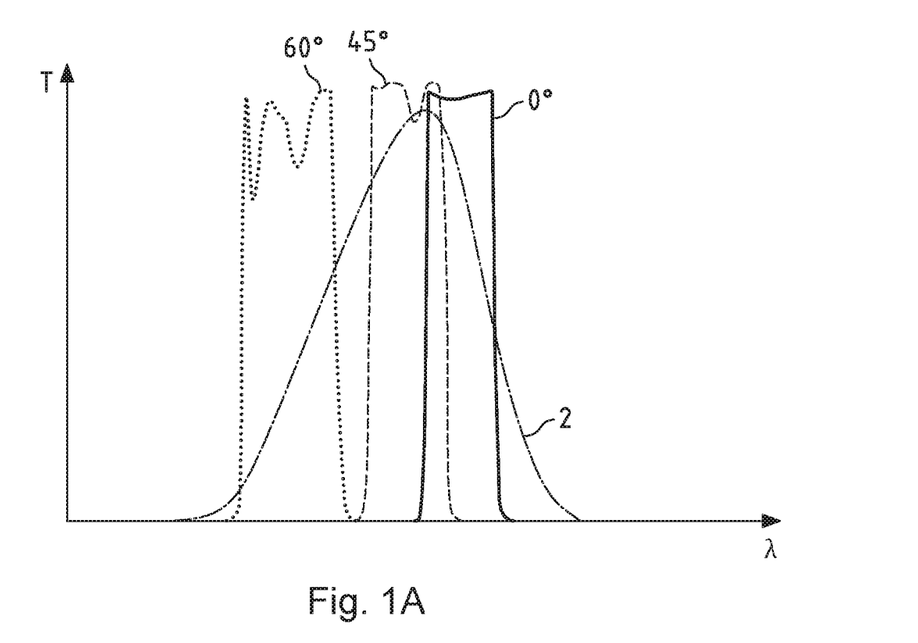
FIG. 1A shows an angular dependence of a transmission passband in a single-passband spectral filter.

FIG. 1A shows an angular dependence of a transmission passband of a single-passband spectral filter. The transmissivity T of the spectral filter is shown in dependence of the wavelength λ, wherein three different incidence angles are plotted. The spectral filter comprises a planar shape, wherein the incidence angle is measured relative to a surface normal of the planar shape. In the example shown in FIG. 1A, transmission passbands for incidence angles of 0°, 45°, and 60° are shown. The transmission passband has a distinct angular dependence on the incidence angle, wherein the transmission passband shifts towards smaller wavelengths with increasing incidence angle. For instance, the center wavelength (CWL) of the transmission passband shifts towards smaller wavelengths with increasing incidence angle.

The spectral filter has a narrow transmission passband in the sense that the transmission passband is narrow in comparison to the wavelength range 2 emitted by a light source such as an LED. The FWHM of the transmission passband of the spectral filter is smaller or equal than 60 nm. The wavelength range 2 may for instance extend from 400 nm to 1100 nm, in particular from 800 nm to 1000 nm for biometric authentication purposes.

Figure 1B:
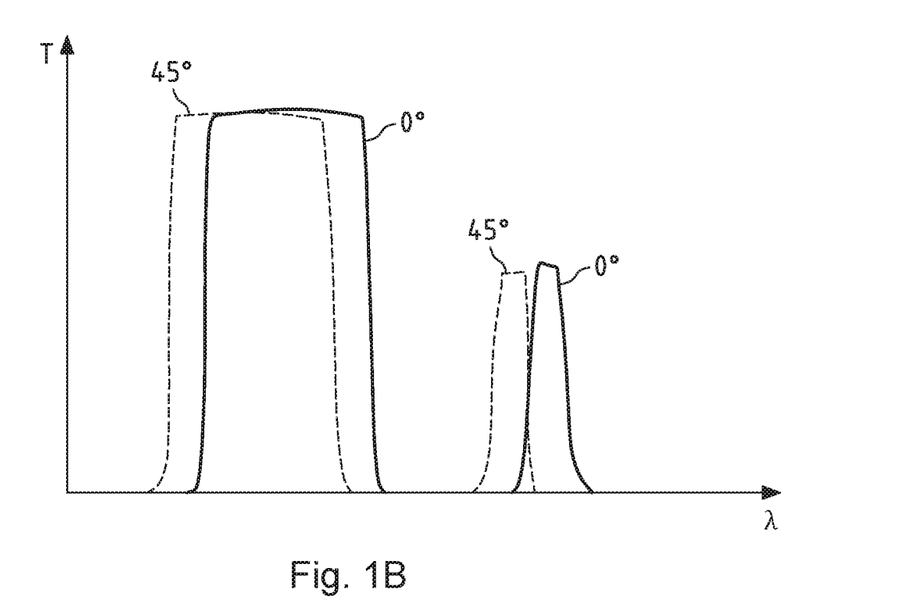
FIG. 1B shows an angular dependence of a transmission passband in a dual-passband spectral filter.

FIG. 1B shows an angular dependence of a transmission passband in a dual passband spectral filter. Two distinct transmission passbands can be seen that both show an angular dependence on the incidence angle, with incidence angles of 0° and 45° being indicated in FIG. 1B.

Spectral filters with properties as shown in FIGS. 1A and 1B may be used in a system for optical imaging according to the invention and may for instance comprise at least one dielectric filter. Further, the spectral filters may also comprise at least one photonic crystal, at least one diffractive optical element, at least one metasurface filter, at least one plasmonic filter, and/or at least one nano-resonator filter.

Figure 2:
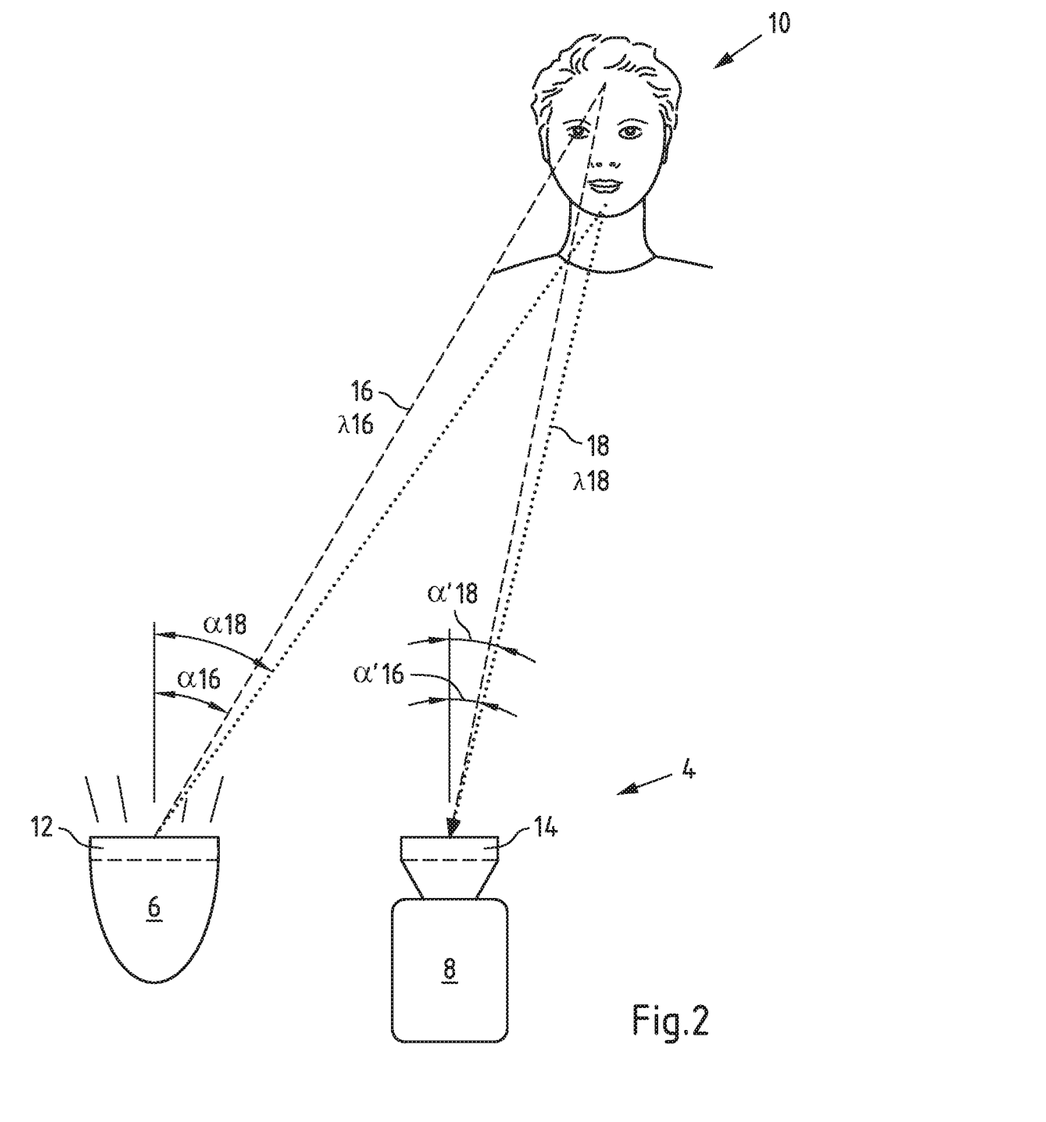
FIG. 2 shows a schematic view of a system according to the first aspect of the invention.
Figure 3:
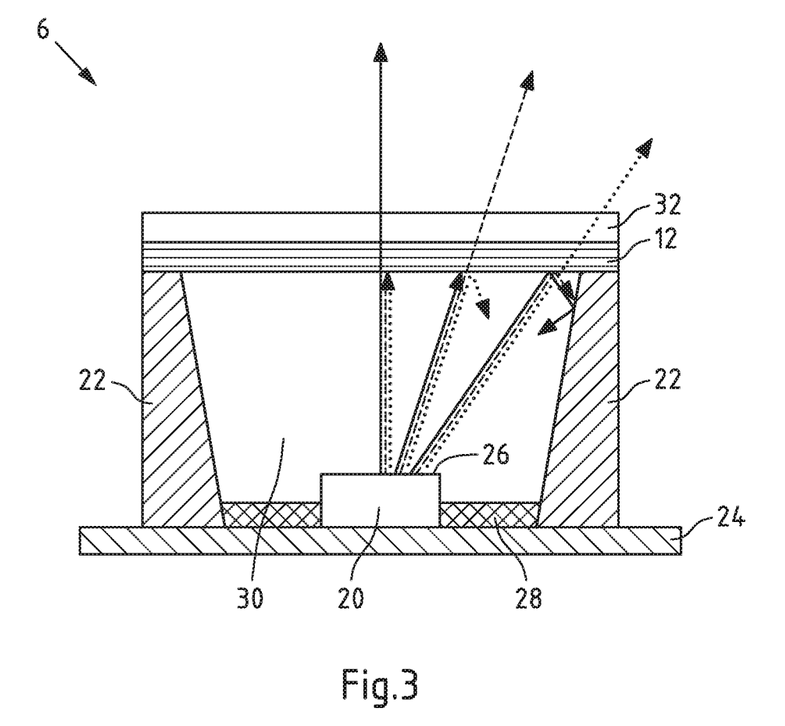
FIG. 3 shows a sectional view of a light source.
Figure 4:
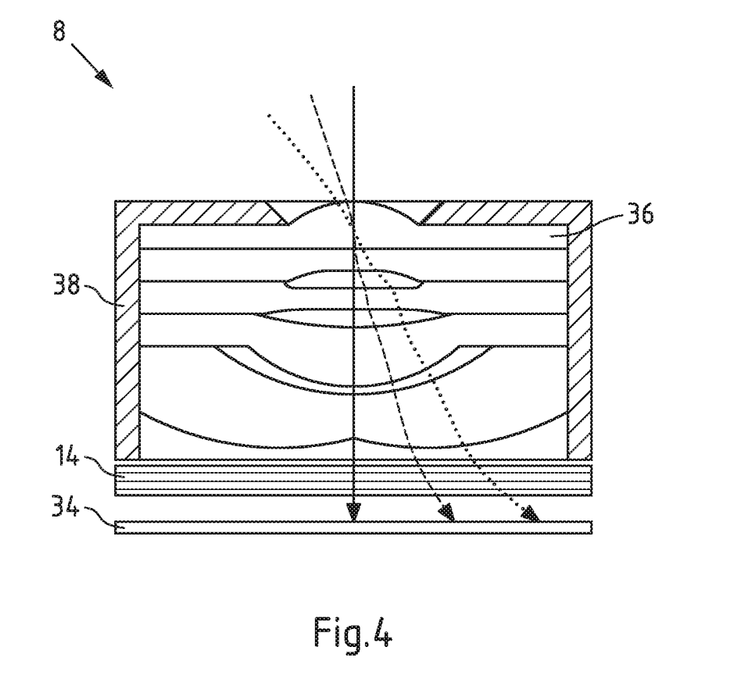
FIG. 4 shows a sectional view of a light detection unit.

FIG. 2 shows a schematic view of a system 4 according to the first aspect of the invention. The system comprises a light source 6 and a light detection unit 8. FIGS. 3 and 4 show sectional views of a light source 6 and a light detection unit 8 that can be used in the system 4, respectively, and are described in further detail below.

The system 4 is configured for optical imaging for optical authentication purposes in that an image of the face of a person 10 is recorded. To this end, the light source 6 serves as a dedicated light source for the light detection unit 8, wherein a first spectral filter 12 and second spectral filter 14 are used to suppress the contribution of ambient light in the image recorded by the light detection unit 8. System 4 may be an element of an electronic device, wherein the electronic device is configured for optical authentication and/or biometric analysis.

The first spectral filter 12 of the light source 6 has a first angular dependence of a transmission passband on an incidence angle and the second spectral filter 14 of the light detection unit 8 has a second angular dependence of a transmission passband on an incidence angle. In particular, to increase the intensity of light originating from the light source 6 that is detected by the light detection unit 8, while first and second spectral filters 12, 14 have narrow transmission passbands, the first angular dependence and the second angular dependence are matched to each other.

In FIG. 2, the light source 6 and the light detection unit 8 are arranged adjacent to each other. The first spectral filter 12 and the second spectral filter 14 have a substantially identical transmission passband in that the first angular dependence and the second angular dependence are substantially identical. For instance, the transmission passband for a given incidence angle is substantially identical and the shift of the transmission passband (e.g. the CWL) due to variations in the incidence angle is substantially identical.

Light ray 16 passes the first spectral filter 12 at a certain incidence angle $\alpha_{16}$ with a wavelength $\lambda_{16}$ within the transmission passband, wherein said transmission passband corresponds to said incidence angle $\alpha_{16}$. After being reflected from the face of person 10, the light ray 16 impinges on the second spectral filter 14 with an incidence angle $\alpha'_{16}$. As the first angular dependence and the second angular dependence are matched to each other, the light ray 16 (with its corresponding wavelength $\lambda_{16}$) may pass the second spectral filter 14 and can be detected in the light detection unit 8.

Light ray 18 passes the first spectral filter 12 at an incidence angle $\alpha_{18}$ with a wavelength $\lambda_{18}$ within the transmission passband, wherein said transmission passband corresponds to said incidence angle $\alpha_{18}$. In this example, the incidence angles $\alpha_{16}$ and $\alpha_{18}$ and—due to the first angular dependence of first spectral filter 12—the wavelengths $\lambda_{16}$ and $\lambda_{18}$ are different. After being reflected from the face of person 10, the light ray 18 impinges on the second spectral filter 14 with an incidence angle $\alpha'_{18}$. Similar to the situation for light ray 16, as the first angular dependence and the second angular dependence are matched to each other, the light ray 18 (with its corresponding wavelength $\lambda_{18}$) may pass the second spectral filter 14 and can be detected in the light detection unit 8.

FIG. 3 shows a sectional view of a light source 6 that may be used in the system 4 depicted in FIG. 2. The light source 6 and the first spectral filter 12 may represent a lighting device according to the second and third aspect of the invention. The light source 6 comprises an LED 20 that is partially encased by a package comprising reflective elements, which are configured as reflective side walls 22 for a substrate 24. The substrate 24 is for instance configured as printed circuit board with a wire 26 providing electrical connection to the front side of the LED 20. The substrate 24 is covered with a reflective coating 28 as reflective element. Reflective side walls 22 and reflective coating 28 for instance comprise white silicone, i.e. silicone with embedded reflective particles such as $TiO_x$. The LED 20 is further surrounded by a transparent filling 30 for protection, e.g. a transparent filling 30 comprising transparent silicone.

The package further comprises the first spectral filter 12, which is supported by a carrier 32. The carrier 32 may for instance comprise glass or transparent plastics. As illustrated by the arrows in FIG. 3, light rays emitted by the LED 20 are filtered by the first spectral filter 12 depending on the incidence angle, wherein the solid, dashed and dotted arrows represent different wavelengths, respectively. In case a light ray does not pass the first spectral filter (as its wavelength is not within the transmission passband corresponding to its incidence angle), the light ray may be reflected by the first spectral filter 12. Due to the reflective elements of the package, the light ray may then be reflected within the package one or more times and may be redirected towards the first spectral filter 12 with a different incidence angle. The package therefore drastically enhances the intensity of light passing the first spectral filter 12, wherein light rays may be reflected until their incidence angle allows the light rays to pass the first spectral filter 12.

FIG. 4 shows a sectional view of a light detection unit 8 that may be used in the system 4 depicted in FIG. 2. The second spectral 14 filter is arranged on an optical sensor 34 such as a CMOS sensor. Similar to FIG. 3, solid, dashed and dotted arrows represent light rays with different wavelengths originating from the light source 6 and being reflected on the object under instigation. A lens assembly 36 is provided, which may for instance be used to focus light rays with the same incidence angle on the lens assembly 36 on the same location of the optical sensor 34, while also retaining the same incidence angle on the second spectral filter 14. The lens assembly 36 is mounted in a lens holder body 38.

As the first and second angular dependence are matched to each other, the amount of light passing the second spectral filter 14 may be optimized, as the light rays travel towards the second spectral filter 14 with an incidence angle that matches the transmission passband of the second spectral filter 14 to the wavelength of the light rays.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

What is claimed is:
1. A system comprising:
   a light source comprising:
     a light-emitting device,
     a first spectral filter opposite the light emitting device, the first spectral filter comprising at least one dielectric filter and having a first angular dependence of a transmission passband, and
     at least one reflector adjacent side surfaces of the light emitting device; and
   a light detection unit comprising:
     an optical sensor, and
     a second spectral filter opposite the optical sensor, the second spatial filter having a second angular dependence of a transmission passband that is matched to the first angular dependence.
2. The system of claim 1, wherein the first spectral filter and the second spectral filter have substantially identical transmission passbands, and the first angular dependence and the second angular dependence are substantially identical.
3. The system of claim 1, wherein at least one of the first spectral filter and the second spectral filter has a narrow transmission passband having a full width at half maximum (FWHM) of 50 nm or smaller.
4. The system of claim 1, wherein the light source is adjacent the light detection unit.
5. The system of claim 1, wherein the second spectral filter comprises at least one dielectric filter.
6. The system of claim 1, wherein at least one of the first spectral filter and the second spectral filter comprises at least one of: at least one photonic crystal, at least one diffractive optical element, at least one metasurface filter, at least one plasmonic filter and at least one nano-resonator filter.
7. The system of claim 1, wherein at least one of the first spectral filter and the second spectral filter has one of a single transmission passband and a dual transmission passband.
8. The system of claim 1, wherein the light-emitting device comprises at least one light-emitting diode.
9. The system of claim 1, wherein the system is one of an optical authentication system and a machine vision system.
10. A lighting device for optical imaging, the lighting device comprising:
    a light source;
    a first spectral filter opposite the light source, the first spectral filter comprising at least one dielectric filter and having a first angular dependence of a transmission passband matched to a second angular dependence of a transmission passband of a second spectral filter of a light detection unit; and
    at least one reflector adjacent side surfaces of the light emitting device.
11. The device of claim 10, wherein the device is for one of optical authentication and machine vision.
12. The device of claim 10, wherein the first spectral filter comprises at least one of: at least one photonic crystal, at least one diffractive optical element, at least one metasurface filter, at least one plasmonic filter and at least one nano-resonator filter.
13. The device of claim 10, wherein the first spectral filter has one of a single transmission passband and a dual transmission passband.
14. The device of claim 10, wherein the light source comprises at least one light-emitting diode.
15. The device of claim 10, wherein the first spectral filter has a narrow transmission passband having a full width at half maximum (FWHM) of 50 nm or smaller.

16. The device of claim 10, further comprising a substrate on which the light source is disposed, the substrate having regions adjacent the light source that are at least partially covered with a reflective coating.

17. The device of claim 16, further comprising a transparent filler material filling empty space between the reflective coating, the light source, the at least one reflector and the first spectral filter.

18. The device of claim 10, further comprising a transparent carrier adjacent the first spectral filter.

19. A method of manufacturing a lighting device for optical imaging, the method comprising:
providing a light source;
providing a first spectral filter, the first spectral filter having a first angular dependence of a transmission passband and comprising at least one dielectric filter;
matching the first angular dependence to a second angular dependence of a transmission passband of second spectral filter for a light detection unit;
partially encasing the light source in a package comprising reflective elements; and
coupling the first spectral filter to the package.

20. The method of claim 19, further comprising filling empty spaces in the package with a transparent filler material.

* * * * *